United States Patent [19]
Pfeffer et al.

[11] 3,984,750
[45] Oct. 5, 1976

[54] ALTERNATOR-RECTIFIER UNIT WITH PHASE WINDING AND RECTIFIER SETS SUBJECT TO SERIES-PARALLEL SWITCHING

[75] Inventors: Peter Pfeffer, Lauffen; Peter Storz, Sindelfingen, both of Germany

[73] Assignee: Robert Bosch G.m.b.H., Stuttgart, Germany

[22] Filed: May 19, 1975

[21] Appl. No.: 578,469

[30] Foreign Application Priority Data
June 4, 1974 Germany............................ 2426956

[52] U.S. Cl................................. 321/16; 321/27 R; 322/32; 322/90
[51] Int. Cl.².......................................... H02M 7/06
[58] Field of Search............. 307/87; 321/5, 16, 18, 321/27 R, 47; 322/28, 29, 79, 32, 90

[56] References Cited
UNITED STATES PATENTS

| | | |
|---|---|---|
| 3,585,484 | 6/1971 | Dortort .................................. 321/5 |
| 3,694,731 | 9/1972 | Cherry .............................. 321/27 R |
| 3,846,695 | 11/1974 | Genuit et al. ...................... 321/27 R |

Primary Examiner—William M. Shoop
Attorney, Agent, or Firm—Flynn & Frishauf

[57] ABSTRACT

Separate three-phase windings are connected to individual rectifiers arranged for series-parallel switching to improve the current-voltage output characteristic. The common exciter winding is fed through a voltage regulator. The switching of the rectifiers is controllable in response to alternator frequency, output current, temperature or efficiency and may be provided with a manual override switch.

14 Claims, 3 Drawing Figures

Fig. 3

ALTERNATOR-RECTIFIER UNIT WITH PHASE WINDING AND RECTIFIER SETS SUBJECT TO SERIES-PARALLEL SWITCHING

The invention relates to an alternator-rectifier, particularly the type utilizing a multi-phase generator and designed for motor vehicle service. The alternator-rectifier of the present invention is of the kind using a single exciter winding and two or more multi-phase windings, typically 3-phase windings, each provided with a separate rectifier diode network.

Generators with two or more rectifier bridges respectively connected to two or more separate single-phase or multi-phase windings in a common generator stator structure provide the possibility to provide one or more variations of the generator output current characteristic for the same generator voltage. Generators of conventional construction cannot adequately fulfill all that is required of them. Either they are capable of producing current even under idling conditions, in which case the maximum current remains small, or the maximum current can be made large, in which case they are generally unable to deliver current when the driving motor is idling. Both of these situations lead to battery drain when the generators are used under present-day traffic conditions for a motor vehicle electric current supply in connection with the usual storage battery. In order to obtain an equalized battery charge balance, a correspondingly larger generator must be used to avoid operating difficulties.

Increasing electric energy requirements in motor vehicles require still greater enlargement of the generator, but this is opposed by the limited space available for it. Furthermore, the efficiency then plays an increasingly important role, because the generator uses up an increasing proportion of the overall motor power.

It is an object of the present invention to provide a motor vehicle electric current source that meets the requirements of the motor vehicle designer and of the motor vehicle user much more effectively and, in particular, an alternator-rectifier current source having a variety of current-voltage characteristics automatically switched, which will overcome the above-described disadvantages of conventional generators.

SUBJECT MATTER OF THE PRESENT INVENTION

Briefly, the alternator is provided with a plurality of separate multi-phase windings, typically two separate three-phase windings on its stator, and a single exciter winding, typically on the rotor, and individual rectifier assemblies are connected to the separate multi-phase windings and interconnected by switching means for selectively switching the respective outputs of the rectifier assemblies automatically into series connection and into parallel connection in response to operating conditions determined externally of the alternator and of the rectifier assemblies.

In the typical case of two three-phase windings, the invention makes possible two current-voltage characteristics. The first characteristic has a very low speed at which there is zero watt output and has a low maximum current, whereas the second characteristic has a relatively high speed or zero watt output and a high maximum current. In this manner the generator is better fitted to its intended applications. Battery charging takes place even at low engine speed and a high charging current and, at the same time, good cooling of the generator is possible at high speeds. The course of the efficiency curve over the entire load and speed region is appreciably improved.

In one form of the invention, the switching is accomplished simply with a short-circuiting relay contactor and a pair of decoupling diodes. The short-circuiting control switch may also be a semiconductor device such as a semiconductor controlled rectifier. In another form of the invention, a double-pole relay switch is used with a set of transfer contacts and a set of make or break contacts.

The relay or equivalent semiconductor device or network is preferably arranged to operate in response to the frequency of the alternator output voltage by means of a frequency detector. The frequency detector can be conveniently provided with an input between a terminal, preferably the negative terminal, of the output of the alternator-rectifier circuit and one terminal of one of the phase windings of the alternator.

If the three-phase windings ar star connected so as to provide in each case a star point, the alternator-rectifier of the present invention can readily be provided with a set of supplementary rectifier diodes between each star point and the respective positive and negative terminals of the rectifier assembly connected to the same winding, so that any output of the alternator at harmonics of the principal output frequency is thereby put to use. The supplementary diodes for this purpose are sometimes referred to as exciter diodes. This illustrates that the present invention can be applied to all known alternator-rectifier systems, which is further illustrated by the fact that it can be used for systems using multi-phase halfwave rectifier assemblies, as well as systems utilizing the more common multi-phase full wave rectifier bridge circuits.

The switching of the rectifier bridges or networks from parallel to series operation can be controlled, instead of in the automatic manner above mentioned, by hand or in automatic response to current magnitude or to a temperature signal.

The supplementary diodes, the decoupling diodes and the switching means can be mounted inside the generator casing. If the switching device should fail, the generator remains in operation in one of the two selectable modes of operation, so that a failure of the switching device does not result in a failure of the generator.

The invention is further described by way of example with reference to the annexed drawings, in which:

FIG. 3 is a circuit diagram of an alternator with two three-phase windings and two halfwave output rectifiers switched by a semiconductor control rectifier (SCR) and decoupling diodes.

Figure 1:
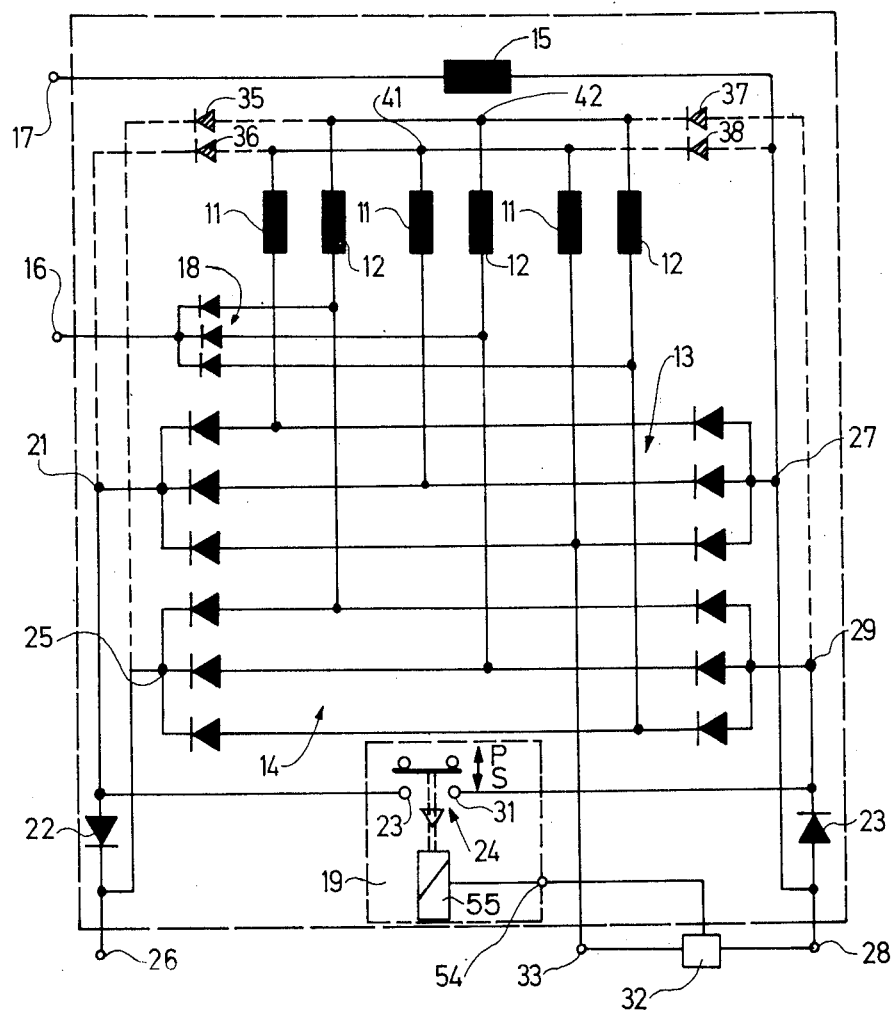
FIG. 1 is a circuit diagram of an alternator with two three-phase windings and two output rectifiers switched by a contact or with the help of decoupling diodes.

FIG. 1 shows a 3-phase alternator with two separate 3-phase windings 11 and 12 and two separate rectifier assemblies 13 and 14. An exciter winding 15 is fed by a voltage regulator (not shown in the drawing) connected to the terminals 16 and 17. A switching device 19 is provided within the generator casing. Two decoupling diodes cooperate with the switching device, a first decoupling diode 22 having its anode connected both to the positive terminal 21 of the first rectifier assembly 13 and to a first contact 23 of the pair of contacts selectively bridgable by the contactor switch 24. The cathode of the first decoupling diode 22 is connected to the positive terminal 25 of the second rectifier assembly 14 and also to the positive output terminal 26 of the alternator-rectifier unit. The second decoupling diode 23 has its anode connected to the negative terminal 27 of the first rectifier assembly 13 and also to the negative output terminal 28 of the alternator-rectifier unit. The cathode of the second decoupling diode 23 is connected both to the negative terminal 29 of the second rectifier assembly 14 and to the second contact 31 of the contactor switch 24. The switching device 19 is operated by a relay coil 55, which is controlled by the output of a frequency detector 32 that has its input connected between the negative terminal 28 of the alternator-rectifier unit output and a terminal 33 of one of the phase windings, for example one of the phase windings of the 3-phase winding 11, of course the terminal of the winding remote from the star connection point 41 when the 3-phase winding is star connected as in the illustrated case. If desired, supplementary diodes 35, 36, 37, 38 can be provided as shown, connecting the respective star points 41 and 42 of the phase windings 11 and 12 to the corresponding positive terminals 21 and 25 and negative terminals 27 and 29 of the respective rectifier assemblies 13 and 14 connected to the corresponding 3-phase windings. The supplementary diodes 35, 36, 37 and 38 serve to utilize the harmonic content of the alternating voltages generated in the phase windings 11 and 12.

Figure 2:
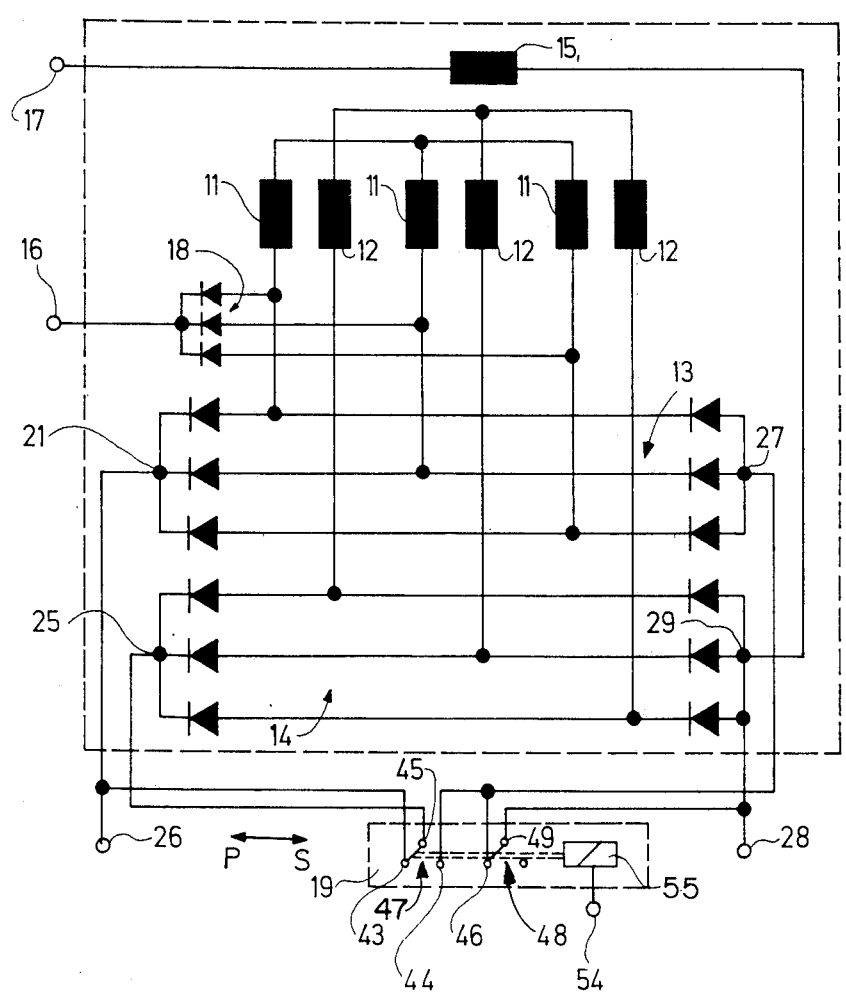
FIG. 2 is a circuit diagram of an alternator-rectifier with two three-phase windings and two output rectifiers switched by a double-pole relay.

The illustrative embodiment shown in FIG. 2 is a variation of the first embodiment shown in FIG. 1. In this variation, the decoupling diodes 22 and 23 are replaced by an equivalent mechanical switching circuit. The switching device 19 in this case includes a first set of transfer contacts 47 and a set of break contacts 48 under common mechanical control again provided by the relay coil 55. The break or normally closed (NC) fixed contact 43 of the transfer contacts 47 is connected to a positive terminal 21 of the first rectifier assembly 13 and also to the positive output terminal 26 of the alternator-rectifier unit. The arm contact 45 of the transfer contacts 47 is connected to the positive terminal 25 of the second rectifier assembly 14. The make or normally open (NO) fixed contact 46 of the transfer contacts 47 is connected to contact 46 of the break contact pair 48 and also to the negative terminal 47 of the first rectifier assembly 13. The remaining contact 49 of the break contact pair 48 is connected to the negative terminal 29 of the second rectifier assembly 14 and also to the negative output terminal 28 of the alternator-rectifier unit.

Figure 3:
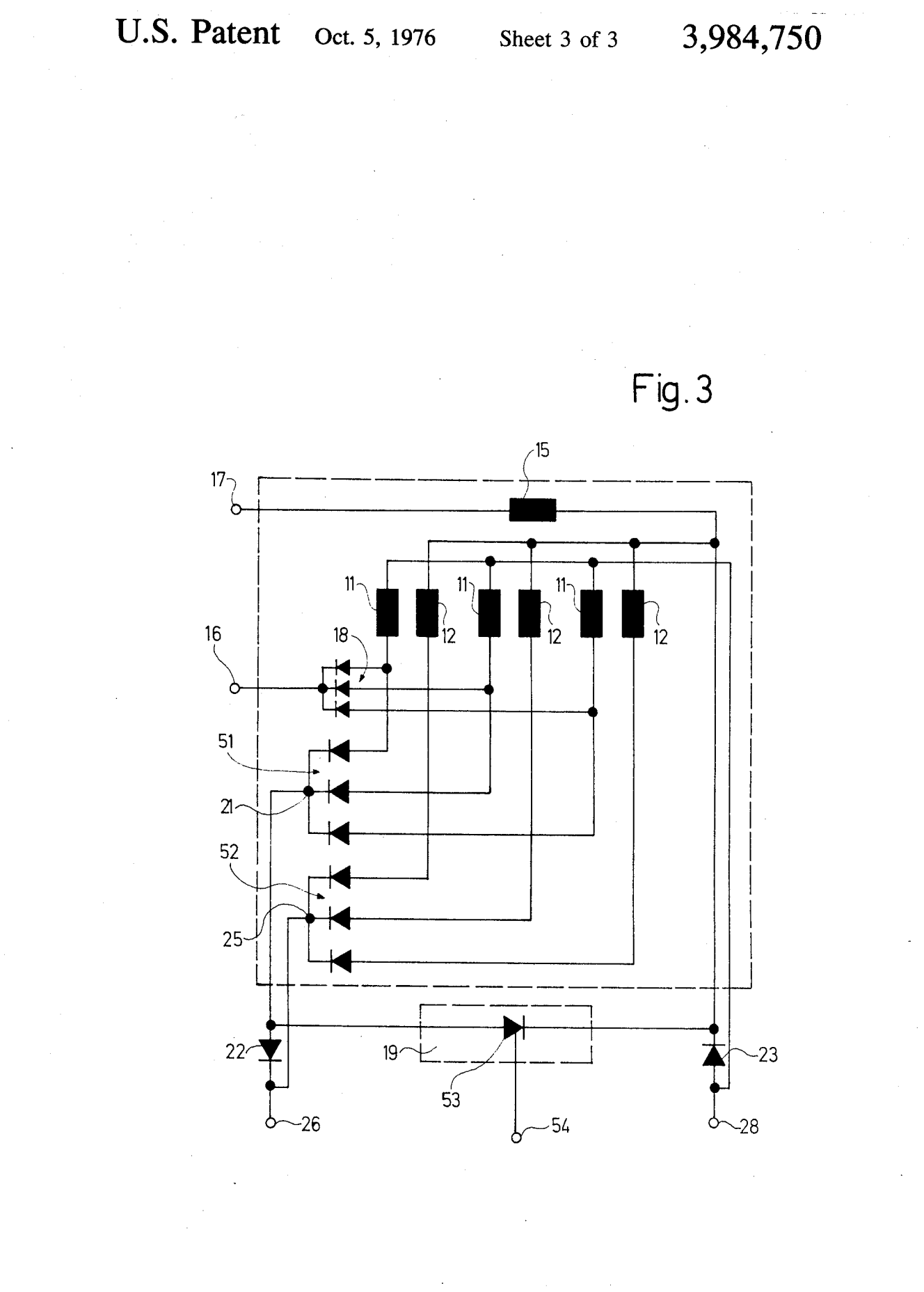

FIG. 3 shows a modification of the embodiment illustrated in FIG. 1. Instead of full wave rectification provided by the bridge rectifiers 13 and 14 of FIG. 1, halfwave rectification is provided with the halfwave rectifier combinations 51 and 52. Furthermore, the relay composed of the relay coil 55 and the contactor 24 is replaced in the switching device 19 by a semiconductor controlled rectifier 53. The control voltage applied through the controlled terminal 54 of the switching device 19 to the control electrode of the SCR can be obtained, just as in FIG. 1, from a frequency detector, but it is also possible to use a current detector, a heat responsive detector or a circuit that provides an output representative of the efficiency of the generator. Finally, if desired, the user of the vehicle can also be enabled to switch the switching device 19 by a manual override control circuit that simply provides the necessary control voltage directly through a manual switch to operate the switching device 19 regardless of the output condition of the frequency detector, current detector, thermal detector or other automatic device that may also be provided.

Thus, although the invention has been illustrated with reference to specific embodiments, it will be understood that variations are possible within the inventive concept and, in particular, variant features illustrated in one of the figures can be used in combination with variant features shown in one or both of the other figures.

What is claimed is:
1. Alternator-rectifier electric current generator system comprising
a multi-phase alternator having a plurality of separate multi-phase windings (11, 12), a single exciter winding (15), a plurality of multi-phase rectifier assemblies (13, 14) respectively supplied by said multi-phase windings;
switching means for switching the respective outputs (21, 27 and 25, 29) of said rectifier assemblies (13, 14) selectively into series connection and into parallel connection, including a short-circuiting switch (24) having first (23) and second (31) switching contacts and means for establishing an electrical connection thereof;
first (22) and second (23) decoupling diodes, the anode of said first decoupling diode (22) and said first switching contact (23) being connected to the positive terminal (21) of a first one of said rectifier assemblies, the cathode of said first decoupling diode (22) being connected to the positive terminal (25) of said second rectifier assembly (14) and to the positive terminal (26) of the output of said generator, the anode of said second decoupling diode (23) being connected to the negative terminal (27) of said first rectifier assembly (13) and the cathode of said second decoupling diode (23) being connected to the negative terminal (29) of said second rectifier assembly (14);
and wherein the second switching contact (31) of the short-circuiting switch is connected to the negative terminal (29) of said second rectifier assembly (14) and to the negative output terminal (28) of said generator.
2. System according to claim 1, in which means are provided for controlling said switching means automatically in response to operating conditions determined externally of said alternator and of said rectifier assemblies.
3. System according to claim 1, in which said switching means (19) is controlled by a relay coil (55).
4. System according to claim 1, in which said short-circuiting switch (24) of said switching means comprises a semiconductor controlled rectifier (53) (FIG. 3).
5. Generator according to claim 1, in which said rectifier assemblies (13, 14) are constituted as multi-phase half-wave rectifier assemblies instead of in the more usual multi-phase bridge rectifier form (FIG. 3).
6. Alternator-rectifier electric current generator system comprising a multi-phase alternator having a plurality of separate multi-phase windings (11, 12), a single exciter winding (15), a plurality of multi-phase rectifier assemblies (13, 14) respectively supplied by said multi-phase windings;

switching means for switching the respective outputs (21, 27 and 25, 29) of said rectifier assemblies (13, 14) selectively into series connection and into parallel connection including first and second switches (47, 48) subject to a common control (55), said first switch being a transfer switch with a switching arm (45) and first (43) and second (44) fixed contacts, said second switch having first (46) and second (49) contacts which are closed when said switching arm (45) makes contact with said first contact of said first switch;

and wherein said first fixed contact (43) of said first transfer switch (47) is connected to the positive terminal (21) of a first one (13) of said rectifier assemblies (13, 14) and also to the positive terminal (26) of the generator circuit output, the switching arm (45) of said first transfer switch (47) is connected to the positive terminal (25) of the second (14) of said rectifier assemblies (13, 14), the second fixed contact (44) of said first transfer switch is connected both to said first contact (46) of said second switch and to the negative terminal (27) of said first rectifying assembly (13) and said second contact (49) of said second switch (48) is connected both to the positive terminal (29) of said second rectifier assembly (14) and to the negative terminal (28) of the generator circuit output.

7. System according to claim 6, in which means are provided for controlling said switching means automatically in response to operating conditions determined externally of said alternator and of said rectifier assemblies.

8. System according to claim 6, in which said rectifier assemblies (13, 14) are constituted as multi-phase half-wave rectifier assemblies instead of the more usual multi-phase bridge rectifier form.

9. System according to claim 6, in which said first and second switches are controlled by a relay coil (25).

10. Alternator-rectifier electric current generator system comprising
a multi-phase alternator having a plurality of separate multi-phase windings (11, 12) and a single exciter winding (15), a plurality of multi-phase rectifier assemblies (13, 14) respectively supplied by said multi-phase windings;
a frequency detector (32) connected to sense the frequency of the output of the alternator;
and switching means for switching the respective outputs (21, 27 and 25, 29) of said rectifier assemblies (13, 14) selectively into series connection and into parallel connection;
the frequency detector (32) being connected to and controlling said switching means automatically in response to frequency of the alternator output.

11. System according to claim 10, in which said frequency detector (32) has its input connected between the negative terminal (28) of the generator output circuit and a terminal (33) of a phase winding (11) of the alternator.

12. Alternator-rectifier electric current generator system comprising
a multi-phase alternator having a plurality of separate multi-phase windings (11, 12) and a single exciter winding (15), a plurality of multi-phase rectifier assemblies (13, 14) respectively supplied by said multi-phase windings;
switching means for switching the respective outputs (21, 27 and 25, 29) of said rectifier assemblies (13, 14) selectively into series connection and into parallel connection;
and a frequency detector (32);
wherein said phase windings are star connected and in which supplementary rectifier diodes (35, 36, 37, 38) are connected between the respective star points (41, 42) of the phase windings (11, 12) and respectively the positive (21, 25) and negative (27, 29) terminals of the respective rectifier assemblies (13, 14) connected to the several phase windings (11, 12), whereby a signal at harmonics of the principal output frequency of the alternator output is obtained, the frequency detector (32) being connected to sense the frequency of said harmonic signal.

13. System according to claim 12, wherein the switching means (19) comprises a short-circuiting switch (24) having first (23) and second (31) switching contacts and means for establishing an electrical connection thereof;
first (22) and second (23) decoupling diodes, the anode of said first decoupling diode (22) and said first switching contact (23) being connected to the positive terminal (21) of a first one of said rectifier assemblies, the cathode of said first decoupling diode (22) being connected to the positive terminal (25) of said second rectifier assembly (14) and to the positive terminal (26) of the output of said generator, the anode of said second decoupling diode (23) being connected to the negative terminal (27) of said first rectifier assembly (13) and the cathode of said second decoupling diode (23) being connected to the negative terminal (29) of said second rectifier assembly (14);
and wherein the second switching contact (31) of the short-circuiting switch is connected to the negative terminal (29) of said second rectifier assembly (14) and to the negative output terminal (28) of said generator.

14. System according to claim 12 wherein the switching means includes first and second switches (47, 48) subject to a common control (55), said first switch being a transfer switch with a switching arm (45) and first (43) and second (44) fixed contacts, said second switch having first (46) and second (49) contacts which are closed when said switching arm (45) makes contact with said first contact of said first switch;
and wherein said first fixed contact (43) of said first transfer switch (47) is connected to the positive terminal (21) of a first one (13) of said rectifier assemblies (13, 14) and also to the positive terminal (26) of the generator circuit output, the switching arm (45) of said first transfer switch (47) is connected to the positive terminal (25) of the second (14) of said rectifier assemblies (13, 14), the second fixed contact (44) of said first transfer switch is connected both to said first contact (46) of said second switch and to the negative terminal (27) of said first rectifying assembly (13) and said second contact (49) of said second switch (48) is connected both to the positive terminal (29) of said second rectifier assembly (14) and to the negative terminal (28) of the generator circuit output.

* * * * *